Dec. 15, 1925.  1,565,986
L. S. CHADWICK ET AL
LATCH FOR FLAME SPREADERS OF OIL BURNERS
Filed Jan. 12, 1922   6 Sheets-Sheet 1

Dec. 15, 1925.  L. S. CHADWICK ET AL  1,565,986
LATCH FOR FLAME SPREADERS OF OIL BURNERS
Filed Jan. 12, 1922    6 Sheets-Sheet 3

Inventors,
Lee S. Chadwick
By Marc Keuck
Hull, Brock & West
Attys

Dec. 15, 1925.

L. S. CHADWICK ET AL 1,565,986

LATCH FOR FLAME SPREADERS OF OIL BURNERS

Filed Jan. 12, 1922   6 Sheets-Sheet 4

Dec. 15, 1925.  
L. S. CHADWICK ET AL  
1,565,986  
LATCH FOR FLAME SPREADERS OF OIL BURNERS  
Filed Jan. 12, 1922  6 Sheets-Sheet 5

Inventors

Dec. 15, 1925.

L. S. CHADWICK ET AL 1,565,986

LATCH FOR FLAME SPREADERS OF OIL BURNERS

Filed Jan. 12, 1922

Inventors,
Lee S. Chadwick and
By Marc Reick
Hull, Brock & West
Attys.

Patented Dec. 15, 1925.

1,565,986

UNITED STATES PATENT OFFICE.

LEE S. CHADWICK, OF SHAKER HEIGHTS, AND MARC RESEK, OF CLEVELAND HEIGHTS, OHIO, ASSIGNORS TO THE CLEVELAND METAL PRODUCTS COMPANY, OF CLEVELAND, OHIO, A CORPORATION OF OHIO.

LATCH FOR FLAME SPREADERS OF OIL BURNERS.

Application filed January 12, 1922. Serial No. 528,833.

*To all whom it may concern:*

Be it known that we, (1) LEE S. CHADWICK and (2) MARC RESEK, citizens of the United States, residing at (1) Shaker Heights and (2) Cleveland Heights, in the county of Cuyahoga and State of Ohio, have invented a certain new and useful Improvement in Latches for Flame Spreaders of Oil Burners, of which the following is a full, clear, and exact description, reference being had to the accompanying drawings.

This invention relates to improvements in that type of oil burners wherein a flame spreader is supported above the wick, the flame spreader serving usually in a secondary capacity as a stop to limit the upward movement of the wick.

In certain recent developments in the art the flame spreader has been employed as a means for setting in operative condition automatic wick stop mechanism. An example of such an adaptation of the flame spreader is shown in Letters Patent No. 1,471,542, issued October 23, 1923. In the construction therein exhibited, the flame spreader is latched to an element of the burner in such manner as to be held against vertical movement with respect thereto. However, whether the flame spreader functions in its secondary capacity purely as a wick stop, or as a wick stop setting means, it constitutes an abutment for the wick and must be latched to the burner structure. It is essential, on the other hand, that the flame spreader be capable of removal from the burner so as to give access to the top of the wick for the purpose of cleaning the latter.

It is the primary aim of the present invention to provide means for latching a flame spreader to a burner structure which is very effective in restraining the spreader against undue elevation and yet which is exceedingly convenient of manipulation to release the flame spreader. In fact, the dominating object of the present invention is to provide a latch for flame spreaders, the actuator whereof constitutes the manual lifting means for the spreader and which is so designed and arranged as to cause the user to naturally grasp the actuator for the purpose of lifting the flame spreader from the burner, the very lifting of the spreader by means of the actuator serving to unlatch the spreader, while the actuator will assume normal position when the spreader is replaced, permitting the latch to operate automatically to again secure the spreader to the burner structure.

Further objects are to provide a flame spreader for oil burners incorporating a latch which is simple of construction and inexpensive of manufacture, which is convenient of incorporation in the spreader, which does not interfere in any way with the normal operation of the spreader nor add appreciably to the cost of the spreader; and to provide latch means of the aforesaid character which is positive of operation; which adjusts itself to irregularities in size and arrangement of cooperating parts; which permits the spreader to be inserted in the burner in any angular position with respect thereto; and which is very substantial and durable and is practically immune from disorder.

The invention is susceptible to numerous modifications and we have illustrated several in the drawings accompanying and forming a part hereof. These present embodiments will serve to illustrate the invention and enable others skilled in the art to understand the nature and principles thereof and to practice the same.

We have shown our improvements associated with a tubular burner comprising inner and outer wick tubes 1 and 2, respectively, between which a wick 3 is adapted to be raised and lowered by wick raising mechanism (not shown). Because burners of this character are so well known to those acquainted with the art it is deemed unnecessary to go further into detail in their illustration. 4 is a spanner that is supported within and transversely of the inner wick tube 1 a suitable distance below its upper edge, and said spanner is arranged to support a flame spreader 5. There is nothing particularly unusual about the general design and construction of the flame spreader and we shall not go into detail in the description of the same except as to those features which enter into our present improvements.

Figure 1:
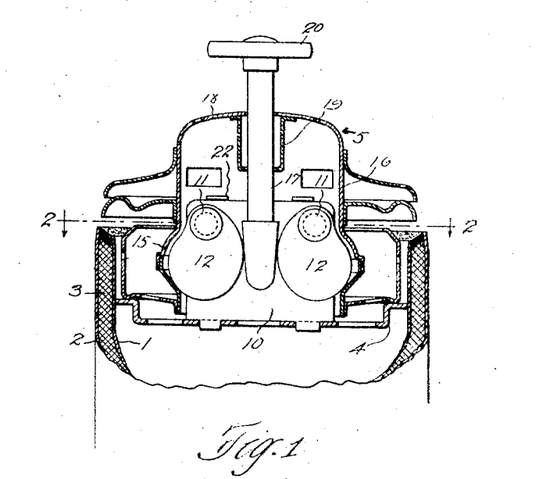
Fig. 1 is a fragmentary central vertical section through a burner showing a flame spreader incorporating one form of our improved latch with the parts in locking position.
Figures 2, 3:
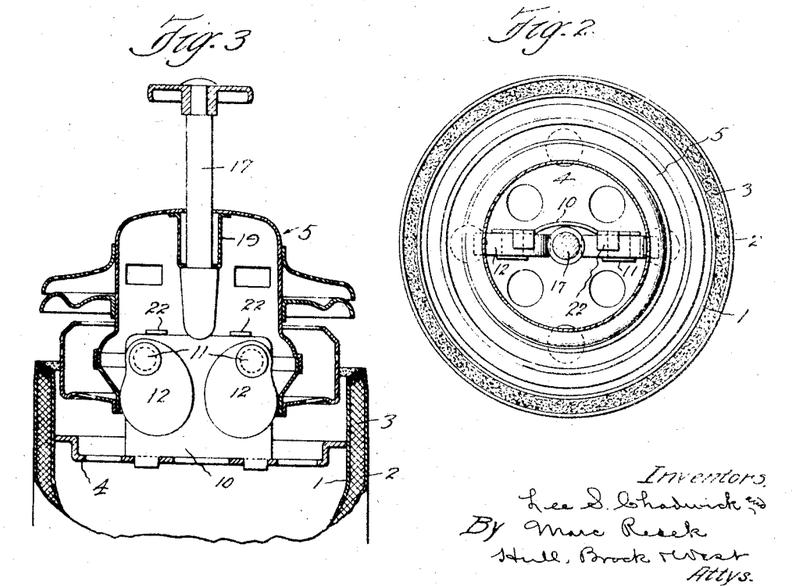
Fig. 2 is a horizontal section on the line 2—2 of Fig. 1.
Fig. 3 is a view similar to Fig. 1, showing the parts unlatched and the spreader as being lifted from the burner.

Describing first that form of the invention illustrated in Figs. 1 to 3, a support 10 is secured to and rises from the spanner 4, and on opposite sides of its transverse center and near its upper edge are pivoted, upon the pivot members 11, pendants 12. These pendants, when hanging free, repose in about the position shown in Fig. 1 with their outer rounded portions occupying an annular recess 15 that is formed in the sleeve 16 of the spreader, and when the parts are in locked position the pendants are retained against swinging inwardly by the presence of the lower tapered end of a pin 17 between them, the pin passing through a central aperture of the top wall 18 of the spreader and being guided within a thimble 19 which is carried thereby. A head 20 is secured to the upper end of the pin 17, and by means of this the pin may be retracted to withdraw its lower end from between the pendants 12 and by it the spreader may be lifted from the burner, the parts being shown in such condition in Fig. 3. It will be observed from an inspection of this last mentioned view that as the spreader rises, the contracted lower end of the sleeve 16 cams the pendants 12 inwardly so as to permit said end to pass them. However, with the pin 17 between them the pendants are restrained against inward movement and consequently no upward force applied to the spreader by the wick will have any effect in lifting it.

To prevent the pendants 12 from turning over and assuming inoperative position stops 22 are turned over within their orbital path from the upper edge of the support 10.

We have mentioned hereinbefore that the design of the latch allows for irregularities in the size and arrangement of the cooperating parts. In explanation of this attention is called to the inclined lower wall of the groove 15, and the gradual taper of the lower end of the pin 17. Now, any variation in the positions of the pendants 12, due to their engaging at different elevations the inclined wall 15, may be compensated for by the taper of the pin, for under any circumstances the pin will drop until it is stopped by the pendants and therefore positively hold them against any possible inward movement. This feature is of considerable importance when it is remembered that in the use of the burner, matter may accumulate on the spanner 4 and prevent the spreader 5 from assuming its usual position. However, in view of the foregoing provision, a positive locking of the spreader is assured at all times. It is obvious that this feature allows for inaccuracies of manufacture and assembly, thus facilitating and cheapening production.

Figure 4:
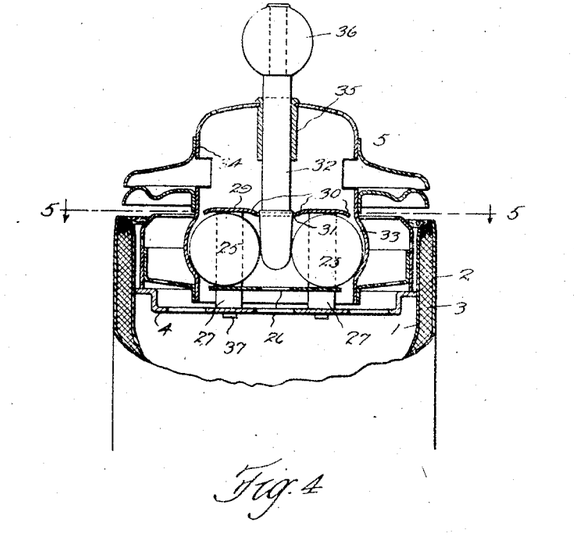
Fig. 4 is a fragmentary vertical section through a burner equipped with a flame spreader incorporating a modified form of the latch.
Figure 5:
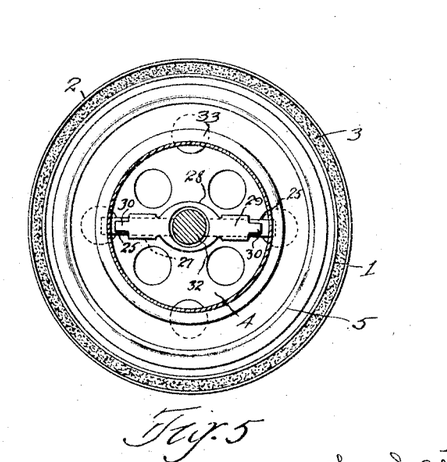
Fig. 5 is a section on the line 5—5 of Fig. 4.

The form of the invention illustrated in Figs. 4 and 5 follows quite closely that above described, the essential difference being in the substitution of rollers 25 for the pendants 12, the rollers resting upon a bar 26 which is supported by and between the opposed members 27 of a retainer 28 which has a top 29 with turned down portions 30 that serve to retain the rollers 25 against dislodgment; and within the central portion of the top 29 there is an aperture 31 through which the pin 32 extends so that its lower end may be inserted between the rollers to force them outwardly into the annular groove 33 that is formed in the sleeve 34 of the spreader. The pin 32 is slidable within a guide 35 that is carried by the top wall of the spreader, and at its upper end the pin is provided with a knob 36 by means of which the pin may be retracted and the spreader lifted. The lower ends of the side members 27 of the retainer have tongues 37 that are extended through slots in the spanner 4 and turned laterally therebeyond thereby to secure the retainer to the spanner.

It is clear from this description that when the spanner is lifted by the knob 36, the initial movement results in the withdrawal of the pin from between the rollers 25 allowing them to roll inwardly along the plate 26 as the restricted lower end of the sleeve 34 passes them.

Figure 6:
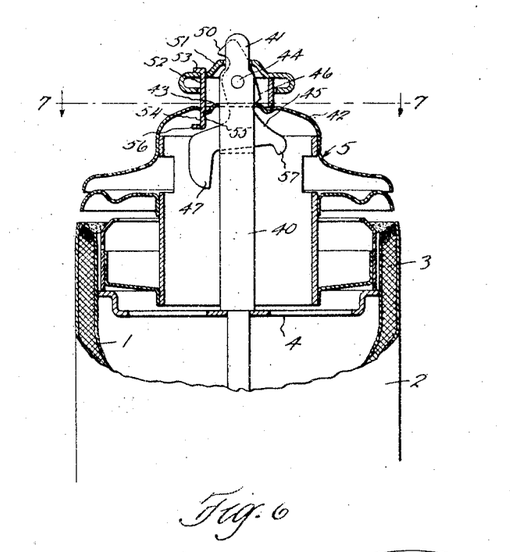
Figs. 6, 7 and 8 are views corresponding to Figs. 1, 2 and 3 of a further modification.
Figure 7:
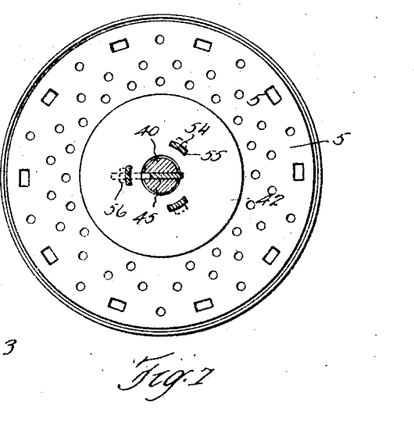
Figure 8:
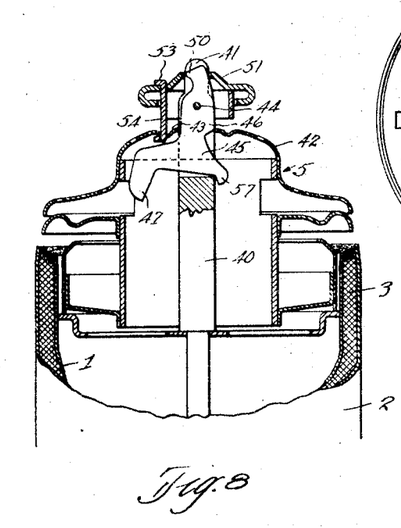

We shall next describe the form of the invention illustrated in Figs. 6, 7 and 8.

Secured to and rising centrally from the spanner 4 is a post 40 which has its upper end reduced at 41, and the post is bifurcated at its upper end to a depth a suitable distance below the dome shaped top wall 42 of the spreader. The top wall has a central aperture 43 that is large enough to readily pass over the post. Pivotally supported upon a pin 44 within the bifurcated upper end of the post is a latch plate 45 involving a keeper 46 that is normally projected out over the top wall 42 of the spreader adjacent the aperture 43 by the weighted end 47 of the latch plate, such end tending to swing the latch plate in a direction to accomplish this result, as will be readily understood upon an inspection of Fig. 6. A nose 50 extends laterally from the upper end of the latch plate on the side of the post opposite that whereon the keeper 46 is located, and this nose is adapted to be engaged by a collar 51 that surrounds the reduced portion 41 of the post 40 when the collar is lifted. The collar 51 is movably connected to the spreader 5 through a member 52, said member consisting of a cylindrical portion from which tongues 53 extend upwardly through slots in the collar 51 and are turned over thereabove to hold the parts together, the member having a plurality of legs 54 which are slidable within slots 55 of the spreader wall 42, the legs terminating at their lower ends in laterally turned tongues 56 which prevent withdrawal of the legs from the slots 55.

It is evident that when the parts are in normal position, as illustrated in Fig. 6, the spreader is effectually held against upward movement with respect to the post 40. Consequently, the wick, when it is elevated and engages the periphery of the spreader, will have no effect in lifting the spreader independently of the post. When it is desired to remove the spreader, as for the purpose of cleaning the wick, the user grasps the collar 51 between the thumb and finger and lifts the same. The initial upward movement of the collar in advance of the spreader causes the collar to engage the nose 50 and swing it inwardly to retract the keeper 46. Undue movement of the latch plate in this direction is prevented by a stop 57 that is arranged to engage the adjacent side of the post 40. When the collar has been elevated sufficiently to accomplish the retraction of the keeper 46, the tongues 56 of the member 52 will have engaged the top wall of the spreader 5 so that further elevation of the collar will carry with it the entire spreader. In replacing the spreader, the aperture 43 slips over the post 40 and as the collar 51 engages the inclined upper edge of the nose 50, it cams the nose inwardly to permit the collar to pass, the weight 47 immediately thereafter returning the parts to normal position to project the keeper 46 over the top wall of the spreader.

It will be readily seen from an inspection of Fig. 6 that, while the weighted end 47 of the latch plate tends to hold the plate in locking position, it is positively held in such condition against accidental dislodgment as from jarring or tilting by the weight of the collar 51, said collar, as will be noted, fitting down over the adjacent side edges of the plate and holding it in a central position.

Figure 9:
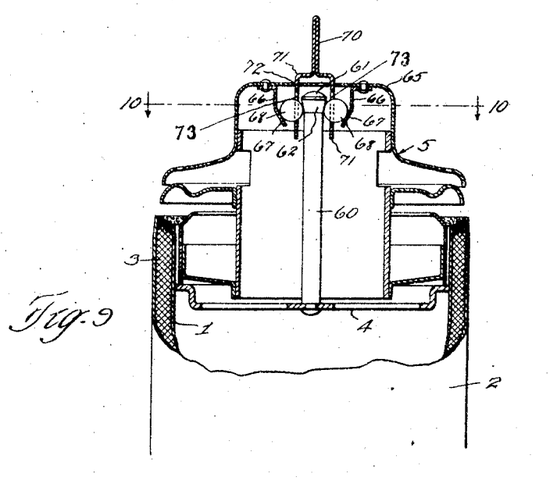
Figs. 9 and 10 are, respectively, a fragmentary sectional side elevation, and a horizontal section on the line 10—10 of Fig. 9, of a burner embodying another form of our invention.
Figure 10:
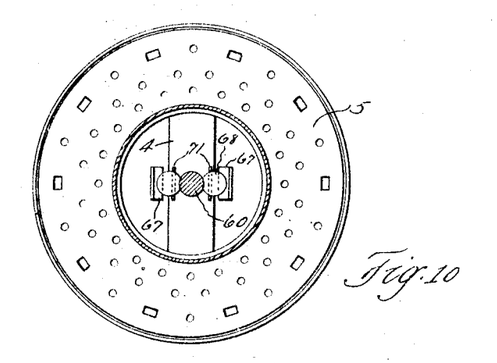

In the form of the invention illustrated in Figs. 9 and 10, a post 60 is supported by and centrally of the burner structure and it terminates at its upper end in a head 61 having an inverted frusto-conical portion 62. Secured to and depending from the top wall 65 of the spreader 5 are plates 66 having inclined portions 67 that are opposed to the frusto-conical portion 62 of the post 60. Locking elements in the form of balls 68 are arranged to normally repose between the inclined portions of the plates and the frusto-conical portion of the post so as to restrain the spreader against being lifted with respect to the post, it being obvious that any lift imposed upon the spreader would be opposed by the frusto-conical head through the intervention of the balls 68 and plates 66. 70 is an actuator that is in the form of a yoke, the branches 71 whereof extend through slots 72 in the top wall 65 of the spreader and depend alongside the plates 66 where they are provided with slots 73 through which the balls 68 project for cooperation with the head 61. These slots are somewhat narrower than the balls are in diameter so as to retain the balls from dropping away from the plates 66 when the separator is removed from the burner. In this form of the invention, to remove the spreader it is only necessary to grasp the upper end of the actuator 70 which will lift the balls 68 and allow them to separate by reason of the upward divergence of the plates 66 so that they will pass over the head 61 and allow the spreader to be readily removed. When the spreader is returned to its place in the burner, the balls 68 drop beneath the head 61 to normal position.

Figure 11:
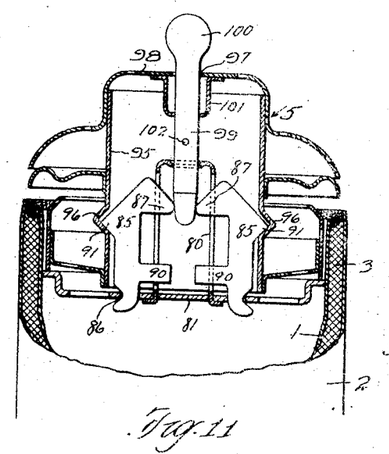
Figs. 11, 12, 13, 14 and 15 are views similar to Fig. 1 showing further modifications of the invention.

In the modification illustrated in Fig. 11, a frame 80 is secured to a spanner 81 as by having tongues at the lower ends of its side members projected through slots in the spanner and turned laterally therebeyond, the spanner, as in the former modification, being situated within and extending transversely of the inner tube 1 of the burner. A pair of locking plates 85 are pivotally connected to the spanner 81 on both sides of the frame 80 as by having their lower ends projected through slots 86 in the spanner, the parts of the plates occupying said slots being reduced in width so that the enlarged portions beyond said slots will restrain the plates from withdrawal from the spanner. Each plate terminates at its upper end in an inwardly directed nose 87. The end of the nose inclines upwardly and outwardly at a slight angle to the vertical for a comparatively short distance and thereabove is inclined outwardly at a considerably greater angle for a purpose which shall presently appear. Projecting from the body portion of each of the plates 85 in the direction of and a suitable distance below the nose 87 is a finger 90. The nose and finger extend through slots in the adjacent side member of the frame 80. An angular projection on the outer edge of each of the plates 85, constitutes what we may term a keeper 91. The spreader 5 that is designed for cooperation with the latch mechanism just described involves a sleeve member 95 having an annular recess or depression 96 that is shown as V-shaped in cross section, for the reception of the keepers 91 of the latch plates 85. Guided within a central aperture 97 of the top wall 98 of the spreader is an actuating pin 99 having a head 100 at its upper end, the pin being further guided through an aperture formed in the inner end of a bell shaped member 101 that is applied to the underneath side of the top wall 98. A stop 102 on the pin 99 restrains the pin from undue upward movement by contact with the member 101. The lower end of the pin 99 is tapered to correspond substantially to the angle of the inner ends of the noses 87. When the spreader is in place, the tapered end of the pin rests between the noses 87 and holds the latch plates 85 outwardly so that the keepers 91 occupy the groove or recess 96. In lifting the spreader from the burner by means of the pin 99, the initial movement of the pin, independently of the spreader, withdraws the tapered end of the pin from between the noses 87 so that when the spreader is raised the latch plates 85 are free to swing inwardly to withdraw their keepers 91 from the groove or recess 96. In placing the spreader within the burner, it is lowered over the latch mechanism, the lower end of the sleeve 95 engaging the outwardly diverging upper ends of the latch plates and forcing them inwardly (if they are not already in inner position), the spreader continuing to descend until it rests upon the spanner with the groove or recess 96 opposite the keepers 91. When the pin 99 is lowered to its normal position its tapered end, engaging between the noses 87 of the latch plates, swings the latch plates outwardly to engage the keepers 91 within the groove or recess 96, in which position the parts are illustrated in Fig. 11.

Figure 12:
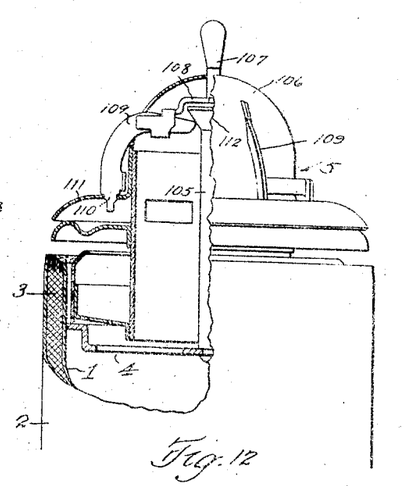

In the form of the invention illustrated in Fig. 12, a rod 105 rises centrally from the spanner 4 and is fixed with respect thereto. Guided for vertical movement within an aperture of the top wall 106 of the spreader is an actuator 107 that is provided with arms 108 which embrace the inwardly directed ends of locking levers 109 in such manner as to cause said levers to be swung outwardly when the actuator is elevated. The locking levers have their outer ends pivotally connected at 110 to the element 111 of the spreader. When the parts are in normal condition, the inner ends of the locking levers 109 engage beneath the conical head 112 of the post 105 and restrain, by reason of their engagement with said head, the spreader against upward movement independently of the post. However, when it is desired to remove the spreader from the burner, it is lifted by means of the actuator 107 and the initial movement of the actuator swings the upper ends of the locking levers 109 outwardly beyond the head 112 so that the spreader may be lifted by means of the actuator free from the burner. In replacing the spreader the locking levers 109 are held expanded as long as the weight of the spreader is supported through the actuator so that the locking levers are not free to resume normal position until after the spreader is in final position and the locking levers are below the plane of the upper end of the head 112.

Figure 13:
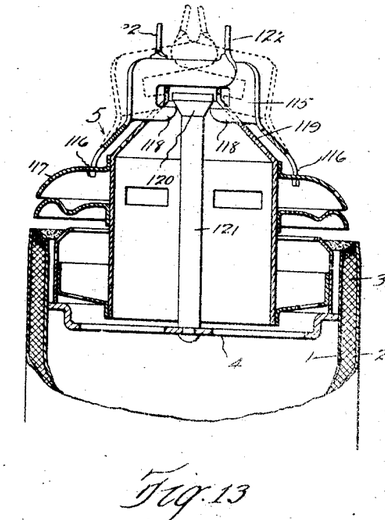

A somewhat similar form of the invention to that just described is found in Fig. 13 where locking levers 115 are shown as pivoted at 116 to an element 117 of the spreader, the levers having keepers 118 which extend through slots in the inclined top wall 119 of the spreader for engagement beneath the conical head 120 of the post 121. The upper ends of the locking levers 115 cross each other and are provided with finger pieces 122. The spreader is lifted by means of the levers, and when they are grasped between the thumb and the finger, they are brought into the position shown in dotted lines in Fig. 13, thus withdrawing the keepers 118 from beneath the head 120 and permitting the spreader to be lifted free from the post 121. The inner ends of the keepers 118 are so formed that they will ride over the head 120 should the spreader be returned to its place in the burner without having hold of the levers 122.

Figure 14:
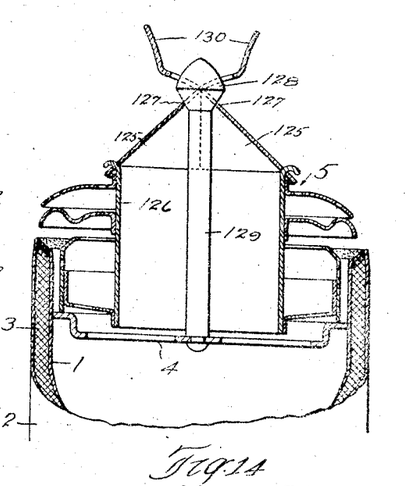

In Fig. 14 we have shown a form of the invention wherein the top wall of the spreader 5 is made up of opposed semi-conical plates 125 which are hingedly connected to a sleeve 126 of the spreader as by having tongues of said sleeve projected through slots in the plates 125 and turned outwardly therebeyond. When the spreader is in place, the upper edge portions 127 of the plates 125 engage beneath the head 128 of the post 129 and lock the spreader against being elevated independently of the post. When it is desired to remove the spreader, the lifting handles 130, which extend upwardly from the plates 125 and cross each other, are drawn together between the thumb and finger and this swings the plates 125 away from each other and removes their upper edges from beneath the head 128, permitting the spreader to be lifted free from the post 129; and when the spreader is returned to its position in the burner and the handles 130 are released, the plates 125 drop to locking position beneath the head 128. It will be observed that in this modification the spreader per se and the latching means have constituents in common in the style of the semiconical plates 125.

Figure 15:
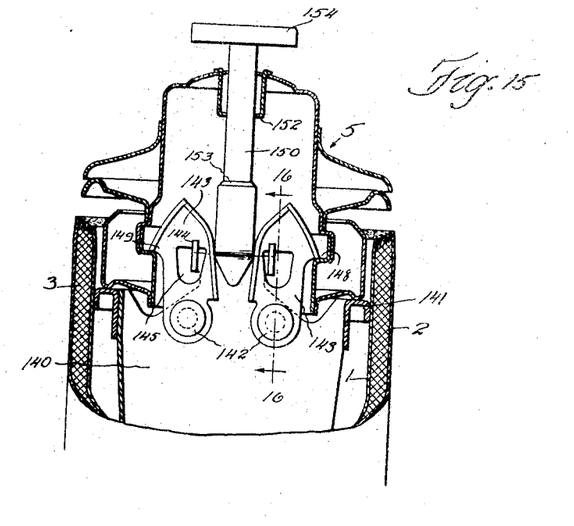
Figure 16:
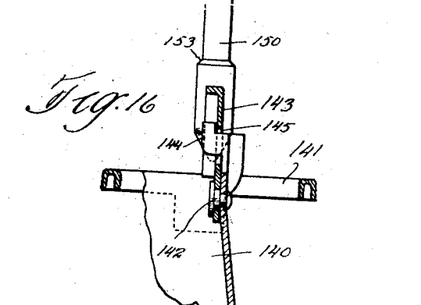
Fig. 16 is a section on the line 16—16 of Fig. 15.

In the form of the invention illustrated in Figs. 15 and 16 a supporting member 140 is carried by an annulus 141 (the equivalent of the spanner in the former modifications) which fits within the upper end of the inner wick tube 1. Pivotally supported through pins 142 from the member 140 are latching elements or tumblers 143 that are limited in their pivotal movement and maintained in proper relation to the supporting member 140 by hooks 144 that are engaged through the openings 145 in the tumblers.

The flame spreader 5 that is designed for use with this form of latching means has an annular shoulder 148 over and into engagement with which the keeper portions 149 of the tumblers 143 are adapted to be moved by a pin 150 when its tapered lower end is inserted between the tumblers. The pin 150 is guided within a hole in the top wall of the spreader and through a member 152 depending from said wall, its upward movement with respect to the spreader being limited by the engagement of a shoulder 153 on the pin with the member 152. The pin is equipped with a head 154 by means of which it may be grasped when lifting the spreader, the pin serving as a manual lifter for the spreader as well as an actuator for the latching means.

This form of latch is very efficient and absolutely positive in its holding qualities as there can be no upward movement of the spreader with respect to the latching elements or tumblers when the keeper portions 149 thereof are maintained in engagement with the shoulder 148 of the spreader through the action of the pin 150.

A very important advantage of our invention over all the flame spreader latches with which we are familiar arises from the fact that in our construction the spreader may be inserted in the top of the cylindrical burner in any angular position with respect thereto, the latch operating under all circumstances, thus contributing greatly to convenience in the use of the burner.

Having thus described our invention, what we claim is:

1. In combination with a burner of the character set forth, a flame spreader adapted to be supported in operative relation thereto, means for locking the flame spreader to an element of the burner rigidly against vertical movement with respect thereto, and further means movably carried by the flame spreader for rendering the locking means ineffective.

2. In combination with a burner of the character set forth, a flame spreader adapted to be supported in operative relation thereto, means for locking the flame spreader to an element of the burner rigidly against vertical movement with respect thereto, and a lifter for the spreader which when used as such acts to render the locking means ineffective.

3. In combination with a burner of the character set forth, a flame spreader adapted to be supported in operative relation thereto, means acting by gravity to rigidly lock the flame spreader to an element of the burner against vertical movement with respect thereto, and means for rendering the locking means ineffective.

4. In combination with a burner of the character set forth, a flame spreader adapted to be supported in operative relation thereto, a member movably carried by an element of the burner and arranged to interlock with a part of the spreader, and means carried by the spreader for retaining said member in holding relation to said part.

5. In combination with a burner of the character set forth, a flame spreader adapted to be supported in operative relation thereto, means for latching the flame spreader to an element of the burner so that the flame spreader is incapable of appreciable vertical movement independently of said element, and a lifter for the spreader that is capable of a limited movement independently of the spreader, the lifter during such movement serving to render the latch ineffective.

6. In combination with a burner of the character set forth, a flame spreader adapted to be supported in operative relation thereto, a latch carried by an element of the burner for locking the flame spreader against appreciable vertical movement independently of said element, and an actuator carried by the spreader and having limited movement independently thereof and by means of which the spreader may be lifted from the burner, the movement of said actuator independently of the spreader resulting from the lifting of the spreader thereby serving to render the aforesaid latch ineffective.

7. In combination with a burner of the character set forth, a flame spreader adapted to be supported in operative relation thereto, said spreader incorporating parts interlocking with parts of the burner for retaining the flame spreader against appreciable vertical movement with respect to said parts of the burner, and a lifter for the spreader which is capable of limited movement independently of the spreader, the movement of said lifter caused by the lifting of the spreader thereby serving to render the interlocking of the aforesaid parts ineffective.

8. In combination with a burner of the character set forth, a flame spreader adapted to be supported in operative relation thereto, members movably carried by an element of the burner and arranged to interlock with parts of the spreader in such manner as to hold the spreader against appreciable vertical movement with respect to said element, and means carried by the spreader for retaining said members in holding relation to said parts, said means constituting a lifter for the spreader and serving to release said members upon the lifting of the spreader by said means.

9. In combination with a burner of the character set forth, a flame spreader adapted to be supported in operative relation thereto, members carried by an element of the burner and adapted to expand into holding engagement with the spreader, and an actuator carried by the spreader and serving as a lifter for the spreader and when utilized as such acts to release the aforesaid members so that they may be contracted.

10. In combination with a burner of the character set forth, a flame spreader adapted to be supported in operative relation thereto, members carried by an element of the burner and adapted to be expanded into holding engagement with the spreader, and an actuator carried by the spreader which serves normally to expand said members, said actuator constituting a lifter for the spreader and when utilized as such acting to release the aforesaid members so that they may be contracted.

11. In combination with a burner of the character set forth, a flame spreader adapted to be supported in operative relation thereto, pendants pivotally suspended from an element of the burner and having parts adapted to repose within a recess of the spreader, and a member slidably carried by the spreader and arranged to project between said pendants to retain them outwardly with their aforesaid parts within the recess of the spreader, said member serving as a lifter for the spreader and retractable from between the pendants when the spreader is lifted thereby.

12. In combination with a burner of the character set forth, a flame spreader adapted to be inserted within the upper end of the burner and comprising a sleeve having an annular recess, the burner having an element which extends into said sleeve when the spreader is in place within the burner, pendants pivotally supported by the aforesaid element and having parts arranged to occupy the annular recess of the spreader, and a member slidable within the spreader and having a part adapted to repose between the pendants for holding them outwardly with their aforesaid parts within the recess of the spreader sleeve, the member serving as a lifter for the spreader and retractable from between the pendants when the spreader is lifted thereby.

13. In combination with a burner of the character set forth, a flame spreader adapted to be supported in operative relation thereto, pendants pivotally suspended from an element of the burner and having parts adapted to repose within a recess of the spreader, and a member movably carried by the spreader and arranged to project between said pendants to retain them outwardly with their aforesaid parts within the recess of the spreader.

14. In combination with a burner of the character set forth, a flame spreader adapted to be supported in operative relation thereto, and means for locking the flame spreader to an element of the burner rigidly against vertical movement with respect thereto, said locking means being effective at any point within a given range of movement thereby to compensate for possible variations in the relative positions of the locking means and element.

15. In combination with a burner of the character set forth, a flame spreader adapted to be supported in operative relation thereto, expansible locking means for securing the spreader to an element of the burner, said means comprising members arranged to be separated, and a part movably carried by the spreader for insertion between said members thereby to separate or expand them.

16. In combination, a burner structure, a flame spreader, expanding members for locking the spreader to the burner structure, and an element insertible between the members for holding them expanded and in locking condition.

17. In combination with a burner of the character set forth, a flame spreader adapted to be inserted within the upper end of the burner in any orientated position with respect thereto, and a latch for detachably securing the spreader to the burner, said latch being effective when the spreader is in any orientated position with respect to the burner.

18. In combination, two major parts, one consisting of a burner structure, and the other consisting of a flame spreader, means carried by one of said units, and the other having a circumferential part wherewith said means engages to lock the spreader to the burner structure in various orientated positions with respect thereto.

19. In locking means for securing a flame spreader to a burner, the combination with the flame spreader and burner, of relatively inclined parts carried by one of the aforesaid elements, and a member carried by the other and adapted to adjust itself between said inclined parts and to engage various portions thereof to lock the spreader to the burner.

20. In combination, two major units, one consisting of a burner and the other consisting of a flame spreader adapted to be supported in operative relation to the burner, one of said units having an abutment portion and the other a latching element shiftable laterally with respect to the axis of the burner into holding relation to the abutment portion, and means for positively maintaining the latching element in such holding relation to said abutment portion.

21. In combination with a burner of the character set forth, a flame spreader adapted to be supported in operative relation thereto, expansible locking means for securing the spreader to an element of the burner, said means comprising members arranged to be spread apart, and a part movably carried by the spreader and by means of which said members may be spread apart or expanded.

In testimony whereof, we hereunto affix our signatures.

LEE S. CHADWICK.
MARC RESEK.